(12) United States Patent
Wilson et al.

(10) Patent No.: US 10,590,016 B2
(45) Date of Patent: Mar. 17, 2020

(54) STORAGE AND DELIVERY FOR A WATER TREATMENT SYSTEM AND METHOD OF USING THE SAME

(71) Applicant: Ecowater Systems LLC, Woodbury, MN (US)

(72) Inventors: Steven K. Wilson, Pine City, MN (US); George L. Dimotsis, Woodbury, MN (US); Richard A. Kirchner, Apple Valley, MN (US)

(73) Assignee: Ecowater Systems LLC, Woodbury, MN (US)

(*) Notice: Subject to any disclaimer, the term of this patent is extended or adjusted under 35 U.S.C. 154(b) by 375 days.

(21) Appl. No.: 15/079,774

(22) Filed: Mar. 24, 2016

(65) Prior Publication Data

US 2016/0280568 A1 Sep. 29, 2016

Related U.S. Application Data

(60) Provisional application No. 62/139,036, filed on Mar. 27, 2015.

(51) Int. Cl.
*C02F 1/469* (2006.01)
*C02F 1/00* (2006.01)

(52) U.S. Cl.
CPC ............ *C02F 1/4691* (2013.01); *C02F 1/008* (2013.01); *C02F 1/001* (2013.01); *C02F 2201/4611* (2013.01); *C02F 2201/4618* (2013.01); *C02F 2209/03* (2013.01); *C02F 2209/40* (2013.01); *C02F 2301/043* (2013.01); *C02F 2301/08* (2013.01); *C02F 2303/22* (2013.01)

(58) Field of Classification Search
CPC .............................................. C02F 1/001–003
See application file for complete search history.

(56) References Cited

U.S. PATENT DOCUMENTS

| | | | |
|---|---|---|---|
| 7,338,595 B2 | 3/2008 | Vannewenhizen et al. | |
| 8,377,279 B2 | 2/2013 | Jha et al. | |
| 8,658,043 B2 | 2/2014 | Wilkins et al. | |
| 2005/0023198 A1* | 2/2005 | Halemba | B01D 61/08 210/106 |
| 2007/0199875 A1* | 8/2007 | Moorey | B01D 61/147 210/206 |
| 2010/0292844 A1* | 11/2010 | Wolf | C02F 9/00 700/271 |
| 2014/0083846 A1 | 3/2014 | Moon et al. | |
| 2015/0027890 A1 | 1/2015 | Jha et al. | |
| 2015/0246831 A1* | 9/2015 | Jha | B01F 5/0608 204/519 |
| 2016/0016835 A1* | 1/2016 | McKinney | C02F 9/00 210/136 |

\* cited by examiner

*Primary Examiner* — Salil Jain
(74) *Attorney, Agent, or Firm* — DeLio Peterson & Curcio LLC; Robert Curcio

(57) ABSTRACT

A system to increase the water recovery ratio and efficiently save water in a water treatment and delivery system, particularly for a water treatment system that may be used for water softening, and more particularly for a water treatment system that employs capacitive deionization technology. Stored product water is delivered without the implementation of an additional pump, and the stored product water is used to recover water in a storage tank without having to send water to drain.

5 Claims, 2 Drawing Sheets

STORAGE AND DELIVERY FOR A WATER TREATMENT SYSTEM AND METHOD OF USING THE SAME

BACKGROUND OF THE INVENTION

1. Field of the Invention

The present invention relates to a storage and delivery system for a capacitive deionized water treatment device used to purify a fluid, and in particular, for storing and delivering filtered water without requiring an additional pump, and without any appreciable loss of water.

2. Description of Related Art

Water softeners remove unwanted minerals, principally calcium and magnesium, from a hard water supply (correcting "high mineral content") by using one of several water conditioning or water treatment methods. Water purification may be implemented by a variety of techniques, such as, reverse osmosis (RO), ion exchange, or electrodialysis, to name few.

The predominant process for water softeners to remove "hardness" (dissolved calcium and magnesium) is through ion exchange. Conventional water-softening appliances intended for household use depend on an ion-exchange resin in which "hardness ions"—mainly $Ca^{2+}$ and $Mg^{2+}$—are exchanged for sodium ions. Ion exchange devices reduce the hardness by replacing calcium and magnesium ($Ca^{2+}$ and $Mg^{2+}$) with sodium or potassium ions ($Na^+$ and $K^+$). Ion exchange resins are organic polymers containing anionic functional groups to which the dications ($Ca^{++}$) bind more strongly than monocations ($Na^+$). Inorganic materials called zeolites also exhibit ion-exchange properties. These minerals are widely used, for example, in laundry detergents. Resins are also available to remove carbonate, bi-carbonate, and sulphate ions, which are absorbed, and hydroxide ions released from the resin.

Incoming hard water passes through a tank of containing high-capacity ion exchange resin beads supersaturated with sodium. The calcium and magnesium ions in the water attach to the resin beads, replacing the sodium, which is released into the water. The softened water is then distributed for use throughout the house.

Over time, the ion exchange resin beads become saturated with calcium and magnesium ions. The resin must then be re-charged by eluting the $Ca^2+$ and $Mg^{2+}$ ions using a solution of sodium chloride or sodium hydroxide depending on the type of resin used. For anionic resins, regeneration typically uses a solution of sodium hydroxide (lye) or potassium hydroxide. The waste or backwash water eluted from the ion exchange column containing the unwanted calcium and magnesium salts are typically discharged to the wastewater treatment system. Sodium ions reclaim their position on the resin beads, and the calcium and magnesium ions are released into the backwash water. The number of times the tank is recharged and the amount of wastewater generated depends on a number of factors, including the hardness of the water, the amount of water used, the size of the water softener, and the capacity of the resins to remove calcium and magnesium.

A capacitive deionization (CDI) technique, which solely depends on electricity for performing water treatment and also for maintaining the equipment, presents an environmentally advantageous approach of being chemical and pollution-free. The method of capacitive deionization (CDI) does not use salt in this process, making it an eco-friendly choice for water decontamination.

CDI electrochemically removes ions from salty water. A saltwater process stream flows between two electrodes held at a potential difference generally around 1.2-1.5 V. Ions in the solution are attracted to the oppositely charged electrodes. The ions are electrosorbed onto the electrodes, removing them from the process stream, and the deionization cycle continues until the electrodes are saturated with ions. Then, during the regeneration cycle, the two electrodes are discharged or the polarity of the electrodes is reversed. This releases the ions into a waste stream, which has a much higher salt concentration than the process stream. This method has a much quicker cycle than typical water softeners using ion exchange resin beads, and at a lower cost.

In capacitive deionization, ions with a negative charge (anions) are removed from the water and are stored in the positively polarized electrode. Likewise, ions with a positive charge (cations) are stored in the negatively polarized electrode.

The major market advantage that CDI currently has over competing technologies is its ability to remove a wide range of ionic contaminants with high recovery rates. CDI can remove nearly all ionic contaminants—sulphates, nitrates, iron, arsenic and fluorides, along with sodium, calcium and magnesium salts.

The operation of CDI includes a series of charging and discharging of a flow-through capacitor comprising a positive electrode and a negative electrode. At the charging of the capacitor, a static electrical field is created between the electrodes of the flow-through capacitor, which readily adsorbs ions from water flowing between electrodes.

Generally, a capacitive deionization (CDI) filtration system is intended to be used to remove undesired concentrations of contaminants from fluids, such as salts dissolved inside the fluids. The CDI system may be intended for multiple applications both in the industrial, commercial, and retail fields, and used for such applications as: seawater desalination; softening of particularly hard water; and the removal from water of various unwanted substances, such as salts (such as chlorides and sulfates), nitrates, nitrites, ammonia, heavy metals, organic substances, and/or micropollutants in general. Moreover, other applications include the capability to deionize fluids in industrial processes or for the concentration of polluting substances that are difficult to dispose of or advantageous to recover for reuse.

Many industrial processes, for example treating metal surfaces such as phosphor-degreasing, polishing, anodization, painting, chromatizing, etc., foresee the use of water in the various productive processes, together with solutions of acids such as phosphoric acid, sulfuric acid, hydrofluoric acid, nitric acid, chromic acid, or rather alkalis such as degreasing products, phosphates, etc. The depuration of the wastewater from the industrial processes is one important aspect of the entire productive cycle, involving ecological, economic, and legal aspects.

The CDI filtration system is suitable for purifying water from ionized particles that are present and susceptible to the presence of an electrical field, such as for example ions in solution, and in particular calcium and magnesium which are the ions most responsible for the hardness of water and formation of limestone. To treat the stream as the water passes between electrodes, a voltage potential is established between the electrodes. This voltage potential causes constituents in the water to be attracted to and at least temporarily retained on one of the electrodes while the comparatively purified water is allowed to exit the capacitor.

Despite its intrinsic advantages, the limited plant efficiency and throughput of CDI technology has hindered its development into an industrial process. One of the reasons that affect its suitability is the low water recovery ratio (with respect to other processes used for brackish water desalination, for example), where the water recovery ratio is defined as the ratio of the amount of treated water obtained to the total amount of input water.

For a given throughput of a plant/process or water softening process, the water recovery ratio and the power consumption per unit volume of water treated are important metrics for judging the effectiveness of a plant/process. The costs of pumping, as well as pre- and post-treatment of water, adds to the rising costs of surface water and makes maximizing the recovery ratio a priority.

SUMMARY OF THE INVENTION

Bearing in mind the problems and deficiencies of the prior art, it is therefore an object of the present invention to provide a system that increases the water recovery ratio and efficiently saves water in a water treatment and delivery system.

The above and other objects, which will be apparent to those skilled in the art, are achieved in the present invention which is directed to a fluid treatment system having an increased fluid recovery ratio, comprising: a fluid drive source; a fluid treatment device receiving fluid from the drive source and producing treated or filtered product fluid; a valve and conduit network directing fluid flow from the drive source to the fluid treatment device; and a pressurized storage tank downstream of the fluid treatment device, the storage tank having an internal volume, and including: a first fluid port in fluid communication with the fluid treatment device; an expandable bag or bladder within the internal volume and connected to the first fluid port, the bladder in fluid communication with the fluid treatment device and separating the product fluid from fluid within the internal volume but external the bladder; and a second fluid port in fluid communication with the fluid within the internal volume but external the bladder; the valve and conduit network connecting the second fluid port of the storage tank to a delivery port, and to the fluid treatment device, such that when the bladder receives product fluid from the fluid treatment device, the bladder expands and displaces fluid within the internal volume but external the bladder to exit the second fluid port and return to the fluid treatment device for treatment, unless the bladder is empty, wherein the fluid within the internal volume but external the bladder is directed via the valve conduit network to the delivery port on demand.

The fluid treatment device includes a capacitive deionizing filtration unit. It may also include a recirculation pump receiving product fluid from the fluid treatment device, and in fluid communication with the storage tank ingress port and the delivery port.

A flow measurement indicator may be implemented for indicating when the bladder is full with product fluid. A pressure switch or transducer may be used to indicate when the bladder is empty. The system may further include an automatic valve for feeding fluid from the second fluid port to the delivery port when the bladder is empty.

In a second aspect the present invention is directed to a water treatment system comprising: a supply water input; a pre-filter; a bypass valve in fluid communication with the supply water input, the bypass valve connected to a supply output; a pressure reducing valve connected to the pre-filter, and in fluid communication with a flow meter and/or pressure transducer; at least one capacitive deionization cell in fluid communication with pre-filter, having an output in fluid communication with a pump, the cell receiving water from the pre-filter and producing treated or filtered product water; the pump in fluid communication with a storage tank and with a supply outlet; the storage tank downstream of the at least one capacitive deionization cell, the storage tank having an internal volume, and including: a first fluid port in fluid communication with the at least one capacitive deionization cell; an expandable bag or bladder within the internal volume and connected to the first fluid port, the bladder in fluid communication with the at least one capacitive deionization cell and separating the product fluid from fluid within the internal volume but external the bladder; and a second fluid port in fluid communication with the fluid within the internal volume but external the bladder, and in fluid communication with the bypass valve; such that when the bladder receives product fluid, the bladder expands and displaces fluid within the internal volume but external the bladder to exit the second fluid port and return to the at least one capacitive deionization cell for treatment, unless the bladder is empty, wherein the fluid within the internal volume but external the bladder is directed to the supply output on demand.

In this second embodiment, the system may include a pressure switch in fluid communication with the supply output and the storage tank first fluid port, the pressure switch monitoring demand of the supply output, and upon sensing a drop in pressure indicating the emptying of the bladder, sending a signal to a timer relay which activates and times the bypass valve to deliver water from the supply input.

A second capacitive deionization cell may be incorporated, which may be in fluid communication with the pre-filter, having an output in fluid communication with the pump, the second capacitive deionization cell receiving water from the pre-filter and producing treated or filtered product water.

The system may further comprise a first valve in fluid communication with the pre-filter and the first capacitive deionization cell, and a second valve in fluid communication with the pre-filter and the second capacitive deionization cell, the first and second valves alternating to allow water to flow to the first cell or the second cell, while the other cell is in a regeneration mode.

A drain valve and a drain for removing regeneration fluid from the first or second cell when the cell is in the regeneration mode may also be employed.

In a third aspect, the present invention is directed to a method of water storage and delivery for a water treatment system comprising: feeding supply water into the system; pre-filtering the supply water; directing the water via a valve network to a capacitive deionized water treatment device to obtain treated product water; directing the product water to a storage tank via a pump; storing the product water in an expandable bladder within an internal volume of the storage tank, the bladder being in fluid communication with the capacitive deionization water treatment device, such that the product water is separated from water within the internal volume of the storage tank that is external the bladder; displacing the water within the internal volume of the storage tank that is external the bladder upon expansion of the bladder, such that the water within the internal volume of the storage tank that is external the bladder is directed to the pre-filter and onto the capacitive deionized filter water treatment device; and delivering the product water from the bladder upon demand to a supply output.

The method may employ a second capacitive deionizing cell to assist in regenerating one capacitive deionizing cell while the other cell operates to produce product water. Regeneration fluid may be directed to drain.

The method further includes monitoring when the bladder is empty of product water, and delivering a blend of product water and supply water to meet long-term demand.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1-2 of the drawings in which like numerals refer to like features of the invention.

The present invention introduces a system that increases the water recovery ratio and efficiently saves water in a water treatment and delivery system, particularly for a water treatment system that may be used for water softening, and more particularly for a water treatment system that employs CDI technology. Introduced is the ability to deliver stored water without the implementation of an additional pump, or without significant loss of water. Similar prior art designs generally require a volume of water equal to the volume delivered to the drain in order to backflush the system and continue water treatment operation.

Product water is introduced into the delivery system utilizing a high pressure storage tank that contains a bladder or membrane bag connected to a pressurized water source and connected to a source of treated water. The system isolates water from the pressurized source from the product water by the bladder/membrane bag. The stored product water is held at the source water pressure, and is delivered on demand by displacement with additional source (drive) water. Once water delivery is completed, newly produced product water is added to the tank displacing the drive water from the storage tank. This displaced drive water is recycled to produce additional product water. Unlike current prior art technology, the drive water is not sent to drain as it is displaced by treated water; rather it is recovered to produce more treated water. This method of water displacement and recovery is especially successful when the water treatment system output is slower than the treated water demand rate, or when the treated water demand is discontinuous.

Figure 1:
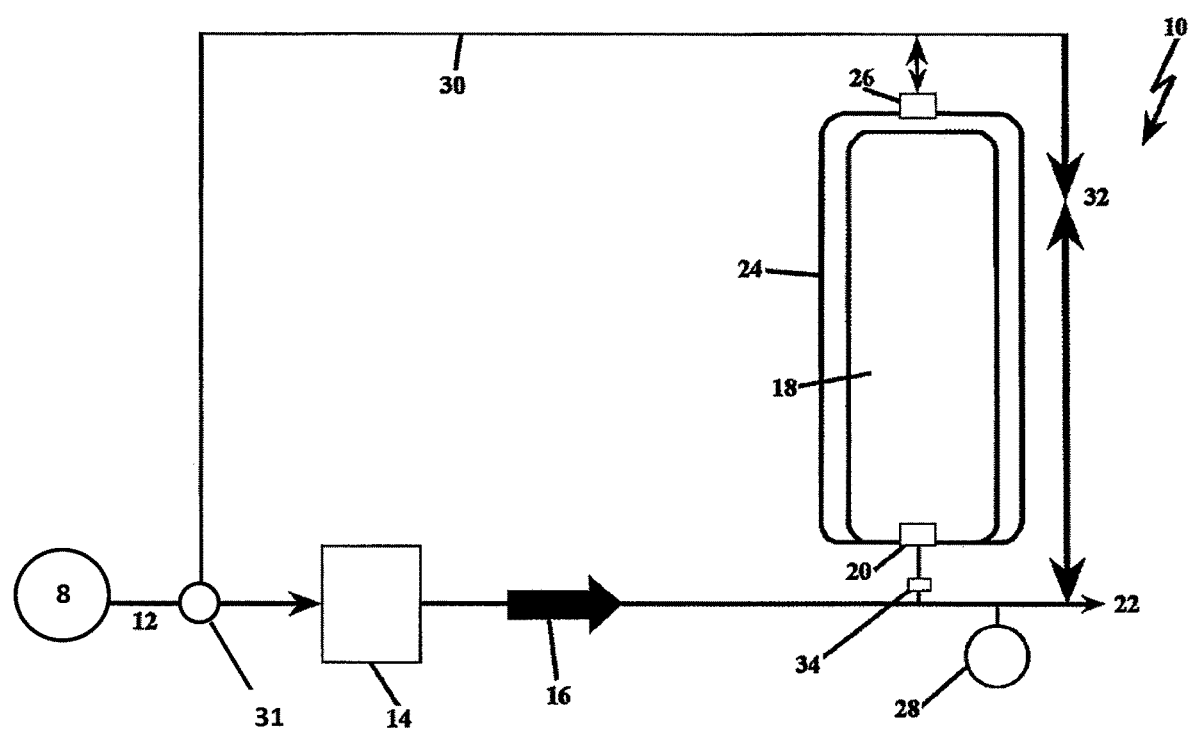
FIG. 1 depicts a schematic of the fluid flow within a water treatment delivery system employing a bladder or membrane within a pressurized storage tank for receiving product water and displacing water in the storage tank.

FIG. 1 depicts a schematic of the fluid flow within a system 10 employing a bladder or membrane 18 within a pressurized storage tank 24 for receiving product water. Water to be treated flows from a fluid drive source 8 through feed water pipe 12 into treatment device 14 via valve 31. In the preferred embodiment, treatment device 14 is a capacitive deionization water treatment apparatus, although the present invention is not limited solely to CDI technology, and the bladder/membrane structure 18 in a pressurized storage vessel or storage tank 24 may be used with other water treatment technologies, without compromising the methodology or efficiency of the present invention.

In one embodiment, treated water flows from treatment device 14 to recirculation pump 16 and either into bladder/membrane bag 18 through inlet/outlet 20 or to service outlet 22 as demand requires. As bladder/membrane bag 18 fills with treated water, water internal to the pressurized storage vessel 24, but external bladder/membrane bag 18, is displaced with the expansion of bladder/membrane bag 18, and is forced to flow through inlet/outlet 26 of pressurized storage vessel 24, where it is then directed to return to treatment device 14 via conduit 30. If, however, bladder/membrane bag 18 is empty, as would be indicated by a pressure switch or transducer 28, the water in pressurized storage vessel 24 is directed via automatic valve 32 towards service outlet 22 on demand.

Once bladder/membrane bag 18 is full as indicated by a sensor, for example a flow measurement sensor or flow transducer 34, or by other indicator (pressure sensor, etc.), the recirculation pump 16 and the treatment device 14 are placed in a standby mode. Upon service water demand (indicated by low pressure at the service outlet 22), water flows from the feed water pipe 12 through conduit 30 and into the pressurized storage vessel 24. This in turn displaces the treated water in bladder/membrane bag 18, forcing this treated water to flow through inlet/outlet port 20 to service outlet 22. In this configuration, no water goes to waste or to disposal. Displacement water from pressurized storage vessel 24 is recycled to the treatment device for treatment.

Figure 2:
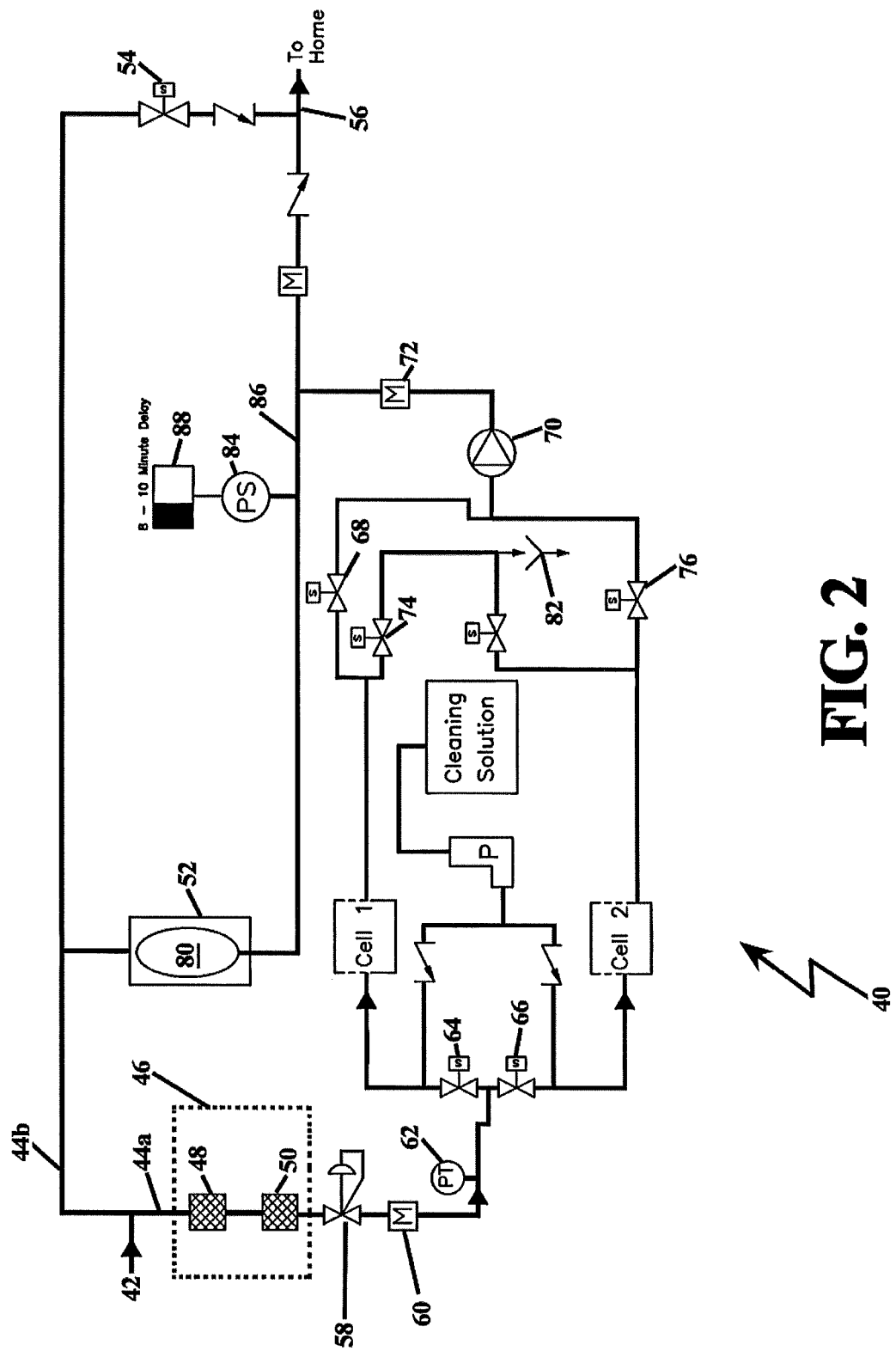
FIG. 2 depicts a schematic of a dual cell water delivery system of the present invention.

FIG. 2 depicts a more detailed schematic of an embodiment of the water delivery system 40 of the present invention. Supply water 42 enters the system 40 into diversion lines 44a, b. Diversion line 44a feeds a pre-filter arrangement 46, which may include a carbon filter 48 and/or a sediment filter 50, although other pre-filter configurations may be employed and the present invention is not limited to any particular pre-filter. Supply water 42 is depicted entering the water delivery system 40 before pre-filter arrangement 46; however, given the recycling nature of the water delivery system, it may also enter after pre-filter arrangement 46.

The supply water 42 in diversion line 44b pressurizes storage tank 52. It also feeds a diversion or bypass valve 54 that provides water to the supply outlet 56 in case of a depleted storage tank, as will be discussed further below.

Supply Water (42) delivered through diversion line 44a is depicted entering carbon filter 48, sediment filter 50, and pressure reducing valve 58. Water flow is monitored by an in-line flow meter 60 and pressure transducer (PT) 62. Pressure transducer 62 indicates if pre-filter 46 is plugged with sediment or clogged for any other reason. At this point, water is directed to at least one cell inlet valve. In the demonstrative embodiment, two cell inlet valves 64, 66 are depicted for feeding two treatment cells 1 and 2. Cell inlet valve 64 feeds Cell #1, and cell inlet valve 66 feeds Cell #2. The cells are preferably CDI water treatment devices, although other water treatment devices may be employed, and the present invention is not limited solely to CDI technology. If two cells are employed, such as shown by Cell #1 and Cell #2, they are preferably operated in alternating fashion. This is not a requisite for implementing the method of the present invention; however, in a preferred embodiment, two cells working in an alternating fashion present efficient water treatment. The cells may also operate in parallel, employing fewer valves and complexity.

Water flow is directed through cell inlet valve 64 into Cell #1 for deionization. As discussed previously, deionization is performed by applying a voltage potential to the electrodes within the cell until Cell #1's capacity for deionization is largely exhausted. Flow of deionized product water continues through valve 68 which preferably contains a flow restrictor that controls the flow and allows the capacity to be measured by time of constant flow, which may be for a predetermined period of time, and has been demonstrated at one minute.

The deionized product water flow pressurizes the feed side or suction side of pump 70, and is pumped through a product flow meter 72 into bladder/membrane bag 80 in storage tank 52, or to the supply outlet 56 upon demand.

Product water that enters bladder/membrane bag 80 displaces the water in storage tank 52 that is outside bag 80, as pump 70 is capable of producing pressure in excess of the pressure of the supply water (42). The displaced water exits storage tank 52 and follows conduit 44*b* into pre-filter 46 (inclusive of carbon filter 48 and sediment filter 50), then through pressure reducing valve 58, flow meter 60, pressure transducer 62, and through cell inlet valve 64. In this manner, water used to pressurize storage tank 52 for product delivery is recycled back to the treatment system, and is not wasted.

Under demand conditions, when product water is not entering storage tank 52, supply water enters the system as described above.

Once Cell #1 reaches its capacity, valve 64 and valve 74 will close, and valve 66 will open, redirecting the water to Cell #2. Water traversing Cell #2 will flow, under normal operating conditions, through valve 76, and onto the suction side of pump 70. At this point, the operation is the same as that described for product water flowing through pump 70 from Cell #1.

While Cell #2 is providing deionization, Cell #1 is undergoing regeneration. Valve 64 remains closed, and the electrodes of Cell #1 are shorted—discharging the capacitor within Cell #1. This regeneration process is performed without water flow through Cell #1.

Once Cell #1 is largely discharged, water is once again allowed to flow through valve 64 through Cell #1 to rinse the accumulated ions and then through valve 74 to drain 82. When the cell is free of ions in excess of those found in the feed water, flow is maintained through valve 64 and valve 74, and an electrical potential of a polarity opposite charge of that of the deionization potential is applied to remove accumulated counter ions.

At the end of the counter ion removal, Cell #1 is considered regenerated. While continuing to flush Cell #1 to drain 82 through valves 64, 74, a deionizing potential is applied to Cell #1 and approximately one cell void volume is allowed to pass through Cell #1 to drain 82 to rinse away any residual salt from the regeneration process. Valves 66 and 76 are closed and Cell #2 is regenerated in the same way as Cell #1.

Upon regeneration of Cell #1, valves 64 and 68 are again opened and Cell #1 is capable of delivering deionized water to the suction side of pump 70 either for supply use or for storage.

When product water is demanded from the system, the product water flows from the product side of storage tank bladder to satisfy the demand until it is empty. If the demand is in excess of the flow rate of the water treatment delivery system (CDI system), the pressure in the product delivery line falls. This loss of pressure causes a pressure switch 84 at the product delivery line 86 to activate, which sends a signal to a timer relay 88. Timer relay 88 activates bypass valve 54 and allows a blend of product water and supply water (42) to flow and meet the demand. Once bypass valve 54 is opened, the supply line is pressurized to an extent that may deactivate pressure switch 84. Timer relay 88 keeps the system from oscillating, attempting to deliver water from an empty storage tank.

The present method of storage and delivery of treated water in a CDI water treatment and delivery system includes feeding supply water into the system; optionally pre-filtering the supply water; directing the water via a valve network to a capacitive deionized water treatment device; directing the now processed or product water to a storage tank via a pump; storing the product water in an expandable bladder within the storage tank; and delivering the product water from the bladder upon demand. The method further includes forcing water from the storage tank as a result of the bladder expansion, the water being directed under operation to the pre-filter and on to the capacitive deionized filter cell.

As noted above, the operation method may also include a dual cell configuration to assist in regenerating one capacitive deionizing cell while the other cell operates to produce product water. A valve network allows the regeneration fluid to drain, and remain away from the supply water line. A pressure switch is employed to monitor when the bladder is empty of product water, and working in tandem with a timer, assist in delivering a blend of product water and supply water to meet any long-term demand.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A fluid treatment system having an increased fluid recovery ratio, comprising:
   a fluid drive source;
   a fluid treatment device receiving fluid from said drive source and producing treated or filtered product fluid;
   a first valve between said fluid drive source and said fluid treatment device, and a first conduit network, directing fluid flow from said drive source to said fluid treatment device;
   a pressurized storage tank downstream of said fluid treatment device, said storage tank having an internal volume, and including:
   a first fluid port in fluid communication with said fluid treatment device;
   an expandable bag or bladder within said internal volume and connected to said first fluid port, said bladder in fluid communication with said fluid treatment device and separating said product fluid from fluid within said internal volume but external said bladder;
   a second conduit network directing fluid flow from said fluid treatment device to the pressurized storage tank and a delivery port;
   a second fluid port in fluid communication with said fluid within said internal volume but external said bladder; and
   a second valve between said second fluid port of said storage tank and said delivery port, and a third conduit network, connecting said second fluid port of said storage tank to said delivery port, a fourth conduit network connecting said second valve and said second fluid port to said fluid treatment device, a flow measurement indicator for indicating when said expandable bag or bladder is full with product fluid;

said second conduit network configured to allow said product fluid to flow from said fluid treatment device either into said bladder or to said delivery port as demand requires, such that when said second conduit network delivers product fluid from said fluid treatment device to said bladder, said bladder expands and displaces fluid within said internal volume but external said bladder to exit said second fluid port, said fourth conduit network configured to allow a return of fluid displaced within said internal volume but external to said bladder to said fluid treatment device for treatment, a pressure switch or transducer for indicating when said bladder is at least partially empty, and said third conduit network configured to direct said fluid within said internal volume but external said bladder to said delivery port on demand when said bladder is at least partially empty as indicated by said pressure switch or said transducer.

2. The fluid treatment system of claim 1 wherein said fluid treatment device includes a capacitive deionizing filtration unit.

3. The fluid treatment system of claim 1 including a recirculation pump receiving product fluid, said recirculation pump placed between said fluid treatment device and said storage tank, and in fluid communication with said storage tank first fluid port and said delivery port.

4. The fluid treatment system of claim 1 including a pressure switch or transducer indicating when said expandable bag or bladder is empty, such that upon an indication of the expandable bag or bladder being empty, said third conduit network is configured to allow fluid displaced within said internal volume but external to said bladder to be directed upon demand to said delivery port.

5. The fluid treatment system of claim 4 including an automatic valve for feeding fluid from said second fluid port to said delivery port when said expandable bag or bladder is empty.

* * * * *